(12) United States Patent
Kuo

(10) Patent No.: US 8,198,552 B2
(45) Date of Patent: Jun. 12, 2012

(54) ELECTRONIC DEVICE AND HOT MELT STRUCTURE THEREOF

(75) Inventor: Yu-Ling Kuo, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 330 days.

(21) Appl. No.: 12/588,376

(22) Filed: Oct. 14, 2009

(65) Prior Publication Data
US 2010/0310827 A1     Dec. 9, 2010

(30) Foreign Application Priority Data
Jun. 3, 2009   (TW) ................................ 98118414 A (51) Int. Cl.
*H01L 23/28*     (2006.01)
*H05K 5/00*      (2006.01)
*B32B 3/00*      (2006.01)
*A63B 37/00*     (2006.01)

(52) U.S. Cl. ...... 174/521; 361/752; 428/156; 264/279.1

(58) Field of Classification Search ............ 428/156, 428/209; 174/521; 361/752; 264/279.1
See application file for complete search history.

(56) References Cited

U.S. PATENT DOCUMENTS

| 3,902,949 | A * | 9/1975 | Norman ........................ 156/252 |
| 4,566,924 | A * | 1/1986 | Hara et al. .................... 156/73.5 |
| 5,672,400 | A * | 9/1997 | Hansen et al. ................ 428/40.1 |
| 5,766,740 | A * | 6/1998 | Olson ............................ 428/209 |
| 2007/0201190 | A1* | 8/2007 | Chen ............................ 361/600 |
| 2008/0182063 | A1* | 7/2008 | Yamanaka et al. .............. 428/76 |

* cited by examiner

*Primary Examiner* — Timothy Thompson
*Assistant Examiner* — Sherman Ng
(74) *Attorney, Agent, or Firm* — Bacon & Thomas, PLLC (57) ABSTRACT

A hot melt structure for an electronic device is disclosed. The electronic device comprises a first component and a second component. The hot melt structure comprises a fixing element and a hot melt element. The fixing element is disposed on the first component, and the hot melt element is disposed on the second component. The hot melt element comprises a gap portion and a hollow portion through which the fixing element is combined with the hot melt element. The height of the hot melt element is larger than that of the fixing element. The hot melt element can be heated to deform inwardly towards the hollow portion for fixing the fixing element.

20 Claims, 10 Drawing Sheets

ELECTRONIC DEVICE AND HOT MELT STRUCTURE THEREOF

BACKGROUND OF THE INVENTION

1. Field of the Invention

The present invention relates to a hot melt structure, and more particularly, to a hot melt structure which is applicable in an electronic device to save the inner space of the electronic device.

2. Description of the Related Art

Figure 1A:
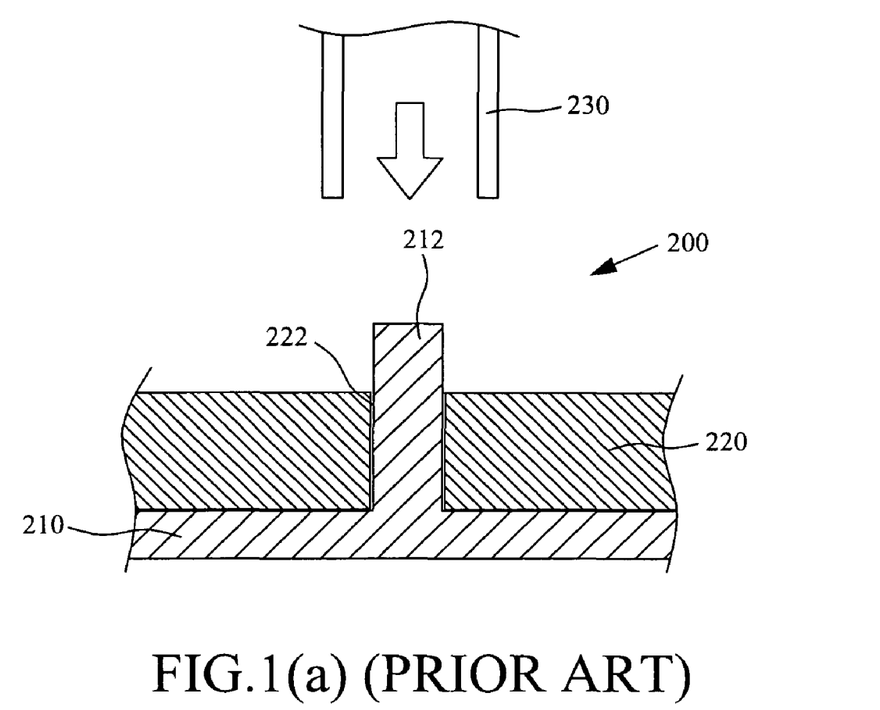
FIGS. 1(a) and 1(b) illustrate sectional views of prior art hot melt structure before and after the hot melting process.
Figure 1B:
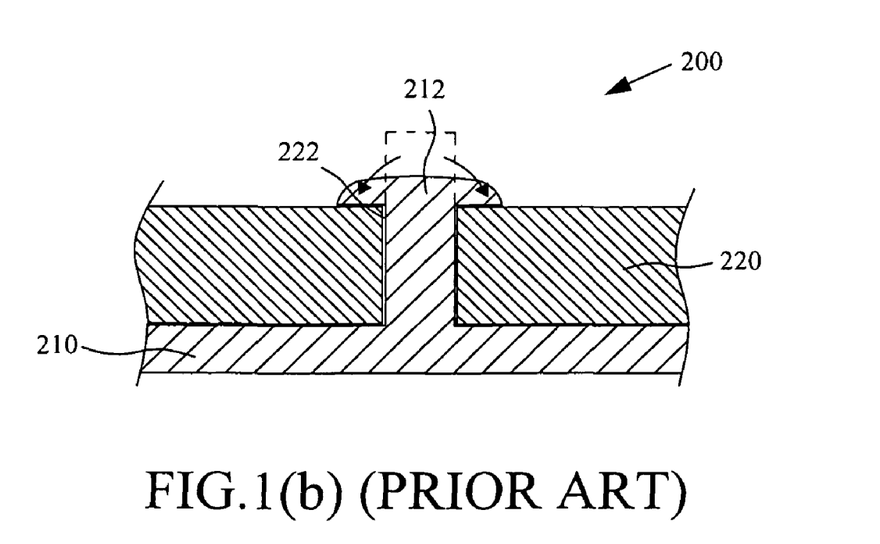

In assembling components in an electronic device, it is common to use screws or hot melt elements to combine two components. For example, the prior art technique in FIG. 1(a) shows an electronic device 200 comprising a main case 210 disposed with a hot melt column 212, and a hot melt opening 222 disposed on the case member 220 to be corresponding to the hot melt column 212. When combining the main case 210 and the case member 220, let the hot melt opening 222 of the case member 220 go through the hot melt column 212 of the main case 210, then use a hot melt jig 230 to heat the hot melt column 212. As shown in FIG. 1(b), the hot melt column 212 will deform when heated, so the hot melt material will flow outwardly from the column; after the hot melt material is cooled down, the hot melt column reshapes into a T-shaped column to fix the case member 220 on the main case 210.

When the hot melt column 212 is disposed near the sidewall of the main case 210, a spacing is required to keep the hot melt column 212 and the sidewall of the main case 210 for a certain distance to prevent the main case 210 from sticking with the case member 220 in the process of inserting the hot melt column 212 through the hot melt opening 222, and to let the hot melt jig 230 have enough space to heat the hot melt column 212. However, this kind of design takes up a lot of available space inside the device and makes it hard to dispose the components inside the limited inner space of the electronic device.

SUMMARY OF THE INVENTION

The main object of the present invention is to provide a hot melt structure which is applicable in an electronic device to save the inner space of the electronic device.

In order to achieve the above object, the present invention discloses a hot melt structure for an electronic device, the electronic device comprises a first component and a second component, the hot melt structure comprises a fixing element and a hot melt element; the fixing element is disposed on the first component; and the hot melt element disposed on the second component; the hot melt element comprises a gap portion and a hollow portion through which the fixing element combines with the hot melt element, wherein a height of the hot melt element is larger than that of the fixing element. The hot melt element is heated to deform towards the hollow portion to fix the fixing element. Therefore, the hot melt structure can effectively fix and position components in the electronic device and save the inner space of the electronic device.

A method for combining the hot melt structure is disclosed, the method comprises the following steps: inserting the fixing element into the hot melt element; and heating the hot melt element to let the hot melt element deform inwardly towards the hollow portion to fix the fixing element.

DETAILED DESCRIPTION OF THE PREFERRED EMBODIMENT

The advantages and innovative features of the invention will become more apparent from the following detailed description when taken in conjunction with the accompanying drawings.

Figure 2:
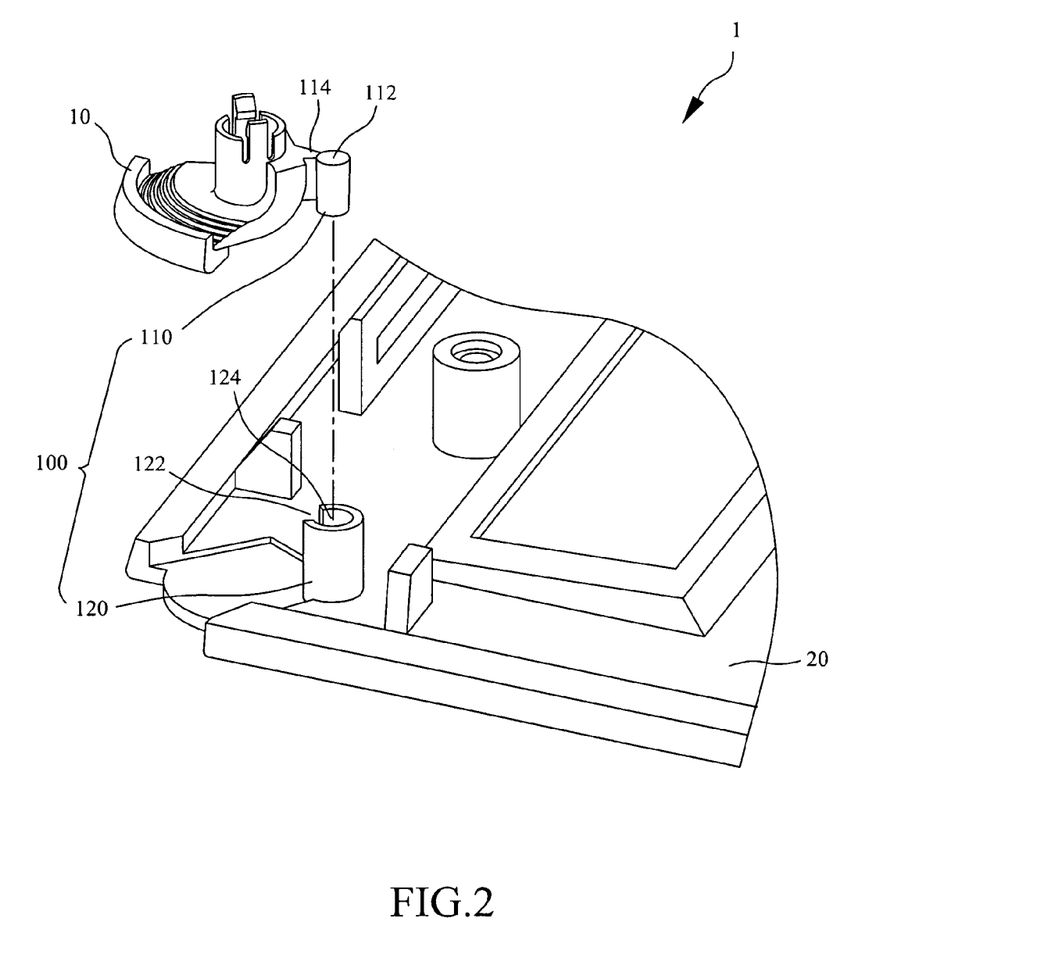
FIG. 2 illustrates an explosive structure view of a hot melt structure in a first embodiment of the present invention.

Please refer to FIG. 2 for an explosive structure view of a hot melt structure in a first embodiment of the present invention. As shown in FIG. 2, a hot melt structure 100 is provided for an electronic device 1, the electronic device 1 comprises a first component 10 and a second component 20. In this embodiment, the first component 10 can be a component of the electronic device 1 to be assembled, the second component 20 can be a main case of the electronic device 1; however, these two components are interchangeable or replaceable by other components and are not limited by the present embodiment.

The hot melt structure 100 comprises a fixing element 110 and a hot melt element 120, the fixing element 110 is disposed on the first component 10, the hot melt element 120 is disposed on the second component 20. In the present embodiment, the fixing element 110 and the first component 10 can form a one-piece structure, while the hot melt element 120 and the second component 20 can form another one-piece structure, but the present invention can have other type of embodiments. The hot melt element 120 is made by a hot melt material, which will deform when heated with a certain temperature. The fixing element 110 comprises a column portion 112 and a connecting portion 114, the column portion 112 connects with the connecting portion 114, the hot melt element 120 comprises a gap portion 122 and a hollow portion 124. The shape of the column portion 112 corresponds to that of the hollow portion 124 of the hot melt element 120 to allow the column portion 112 to be inserted into the hollow portion 124. The connecting portion 114 of the fixing element 110 can correspondingly go through the gap portion 122 of the hot melt element 120. In this embodiment, the hot melt element 120 is designed to have a shape like a cylinder; however, the hot melt element 120 can have other shapes such as a rectangular pole or other similar structures.

Figure 3:
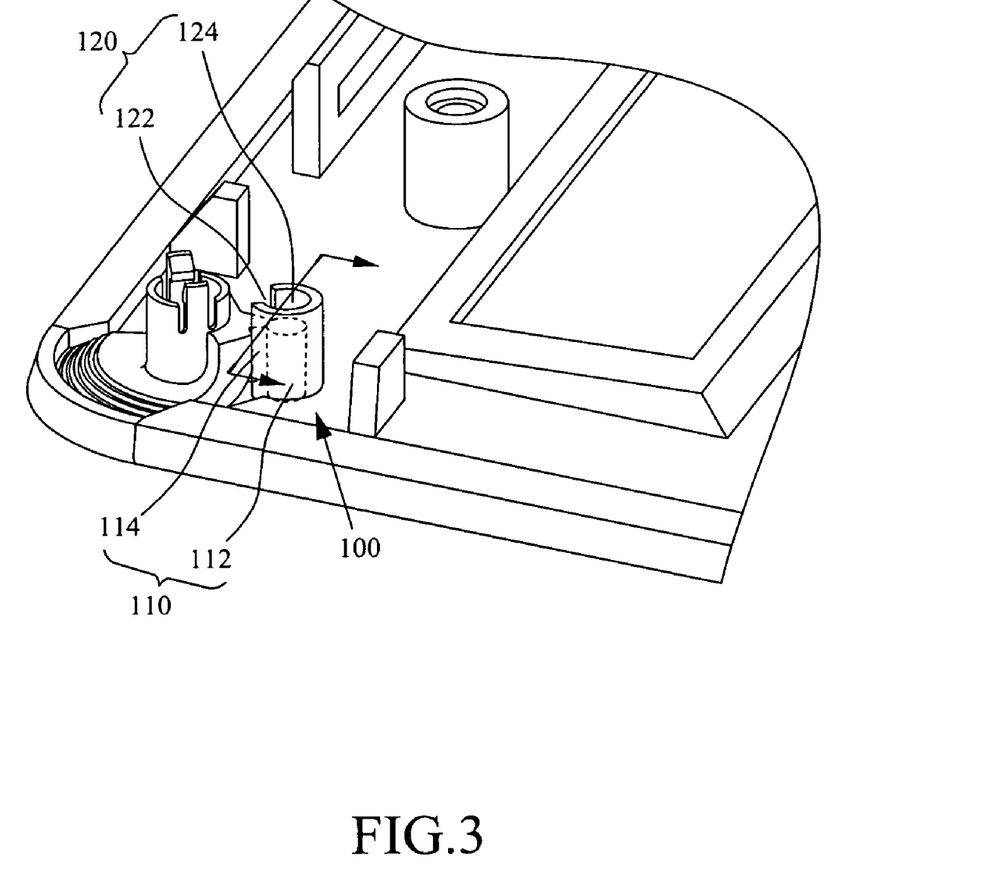
FIG. 3 illustrates an assembling view of the hot melt structure in the first embodiment of the present invention.

Please refer to FIG. 3 for an assembling view of the hot melt structure in the first embodiment of the present invention. As shown in FIG. 3, the fixing element 110 corresponds to the hot melt element 120 to let the connecting portion 114 correspondingly go through the gap portion 122; besides, the column portion 112 is correspondingly inserted into the hollow portion 124 so as to let the fixing element 110 combine with the hot melt element 120. The cross-sectional diameter of the column portion 112 is larger than the minimum width of the gap portion 122, so when the column portion 112 is inserted into the hollow portion 124, the width of the gap portion 122 will restrain and hold the column portion 112 in position; therefore the column portion 112 will not break away from the hot melt element 120 through the gap portion 122.

Figure 4A:
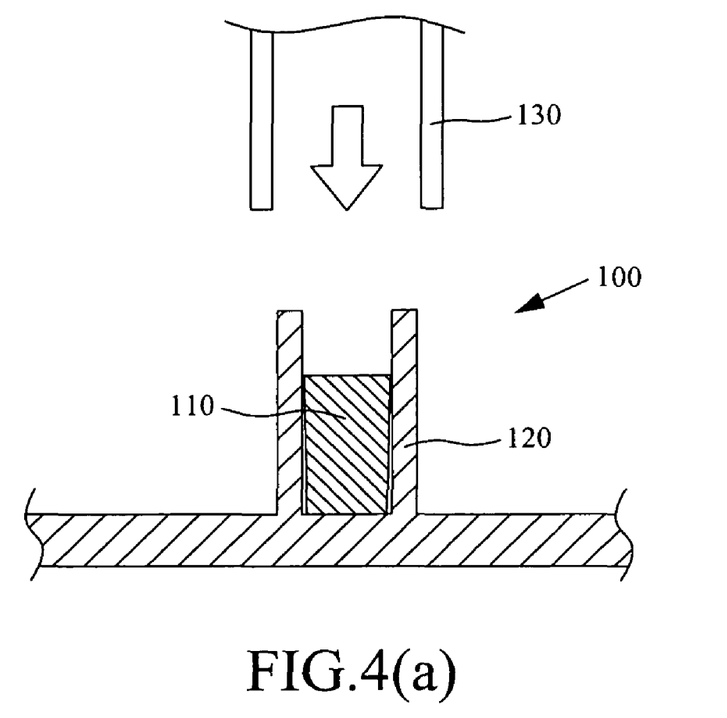
FIGS. 4(a) and 4(b) illustrate sectional views of the hot melt structure in the first embodiment before and after the hot melting process.
Figure 4B:
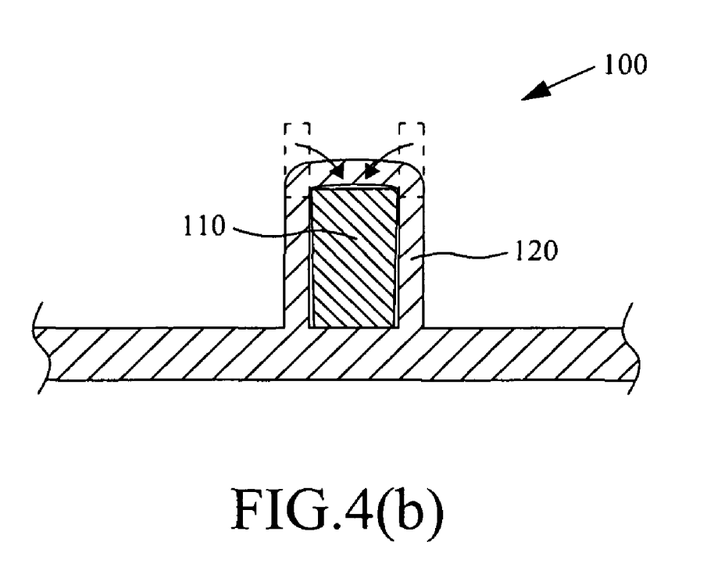

Please refer to FIGS. 4(a) and 4(b) for sectional views of the hot melt structure 100 in the first embodiment before and after the hot melting process. As shown in FIG. 4(a), the fixing element 110 is inserted into the hot melt element 120, wherein the height of the hot melt element 120 is larger than that of the fixing element 110; therefore, when the hot melt structure 100 is heated to melt, there is enough heated hot melt element 120 to cover and restrain the fixing element 110. Afterwards the hot melt element 120 is heated by using a hot melt jig 130. As shown in FIG. 4(b), the hot melt element 120 will deform inwardly when it is heated; therefore the fixing element 110 is covered by the hot melt element 120. When the deformed hot melt element 120 is cooled down, it becomes the element for fixing the fixing element 110, thereby providing fixing and positioning effects to the hot melt structure 100.

Figure 5A:
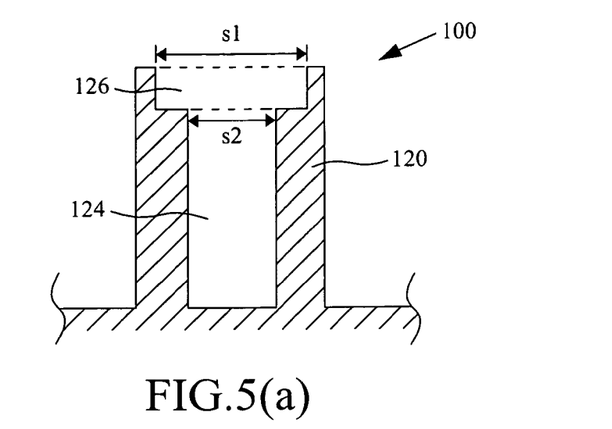
FIG. 5(a), (b), (c) and (d) illustrate sectional views of the hot melt structure each having one single type of concave portion in the present invention.
Figure 5B:
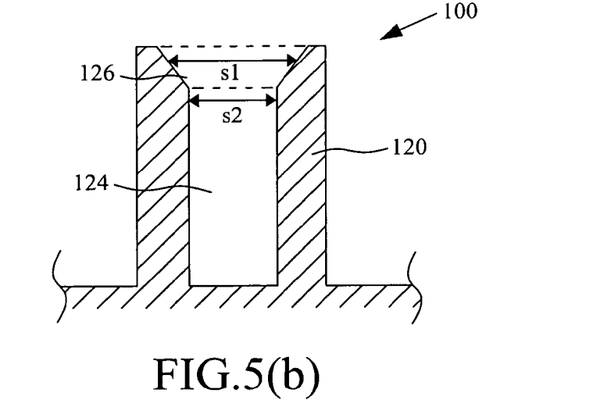
Figure 5C:
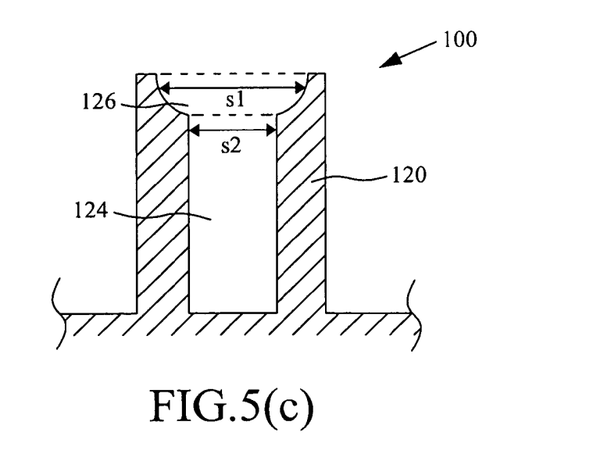
Figure 5D:
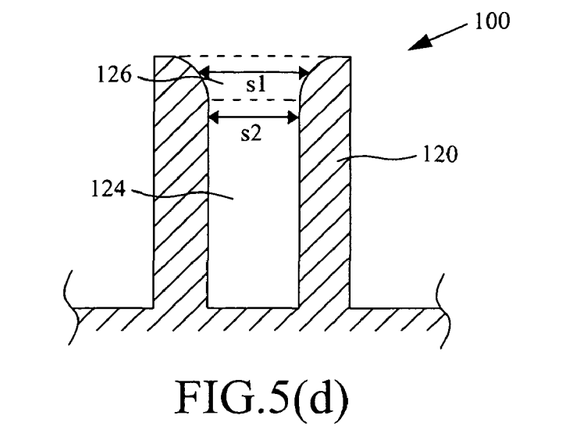

Please refer to FIG. 5(a), (b), (c) and (d) for sectional views of the hot melt structure 100 each having one single type of concave portion 126 in the present invention. As shown in FIG. 5(a), the hot melt element 120 further comprises the concave portion 126, the transverse cross sectional diameter s1 of the concave portion 126 is not smaller than the transverse cross sectional diameter s2 of the hollow portion 124. When the concave portion 126 is applied, it is easier for the heated hot melt element 120 to flow to the hollow portion 124, thereby enhancing the tendency of flowing inwardly. In this embodiment, the longitudinal section of the concave portion 126 can be a rectangular structure (the area surrounded by the dotted line). As shown in FIG. 5(b), the transverse cross sectional diameter s1 of the concave portion 126 changes along with longitudinal depth of the concave portion 126. The present invention is implemented so that the transverse cross sectional diameter s1 decreases when the longitudinal depth of the concave portion 126 increases, so the hot melt element 120 tends to flow to the hollow portion 124 when it is heated and restrained by the concave portion 126 at the same time. In this embodiment, the longitudinal section of the concave portion 126 can be a trapezoid structure, which comprises slant edges to facilitate the inward flowing effect. As shown in FIG. 5(c) and FIG. 5(d), the longitudinal section of the concave portion 126 can be a structure which comprises two opposing sides formed as curves; and the transverse cross sectional diameter s1 decreases when the longitudinal depth of the concave portion 126 increases; in this embodiment, the arc-shaped slant edges can also provide the similar effect as that provided in the previous embodiments.

Figure 6A:
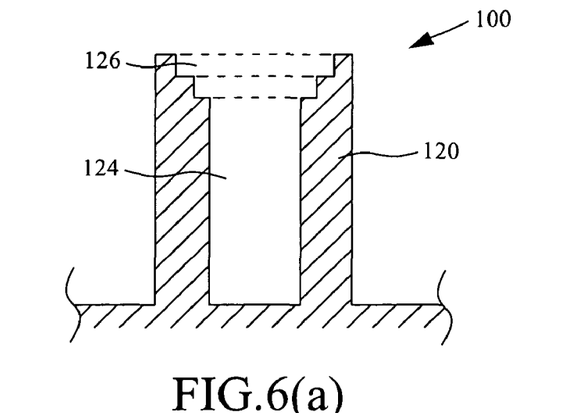
FIG. 6(a), (b) and (c) illustrate sectional views of the hot melt structure each having a combinational type of concave portion in the present invention.
Figure 6B:
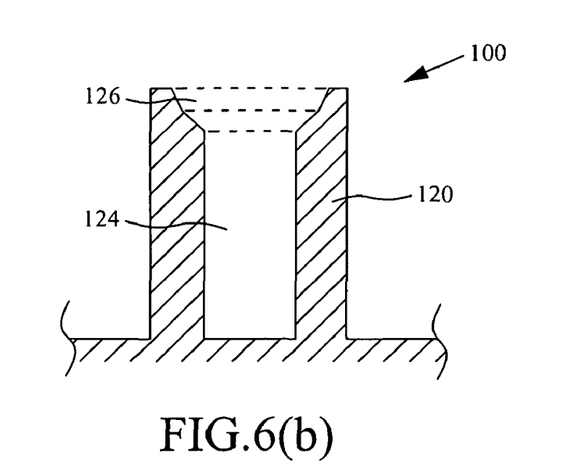
Figure 6C:
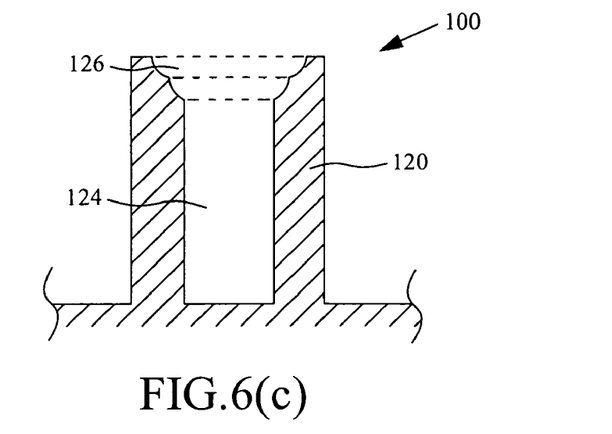

Please refer to FIG. 6(a), (b) and (c) for sectional views of the hot melt structure 100 each having a combinational type of concave portion in the present invention. The longitudinal section of the concave portion 126 described above can have a plurality of rectangular structures, trapezoid structures or structures comprising two opposing curves. As shown in FIG. 6(a), the concave portion 126 can be a step structure to let the longitudinal section of the concave portion 126 comprise two sets of rectangular structures, while the length of the top rectangular structure is larger than that of the bottom rectangular structure. As shown in FIG. 6(b), the longitudinal section of the concave portion 126 can be formed by combining two trapezoid structures having different slopes; therefore the transverse cross sectional diameter of the concave portion 126 decreases as the longitudinal depth increases. As shown in FIG. 6(c), the longitudinal section of the concave portion 126 can be formed by combining two structures each comprising two opposing curves, wherein the transverse cross sectional diameter of the concave portion 126 also decreases as the longitudinal depth increases in this embodiment to achieve the inward flowing effect.

Figure 7A:
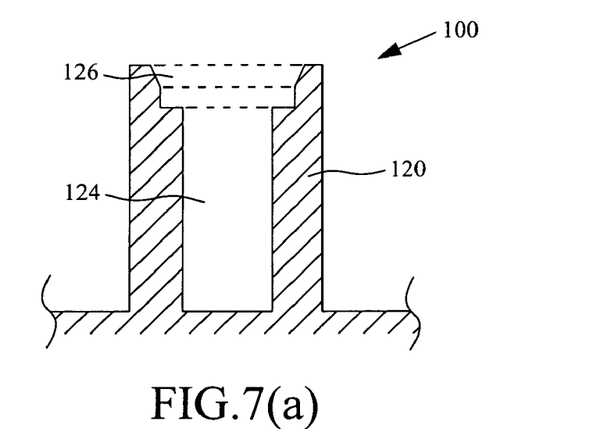
FIGS. 7(a) and 7(b) illustrate sectional views of the hot melt structure each having different combinational type of concave portion in the present invention.
Figure 7B:
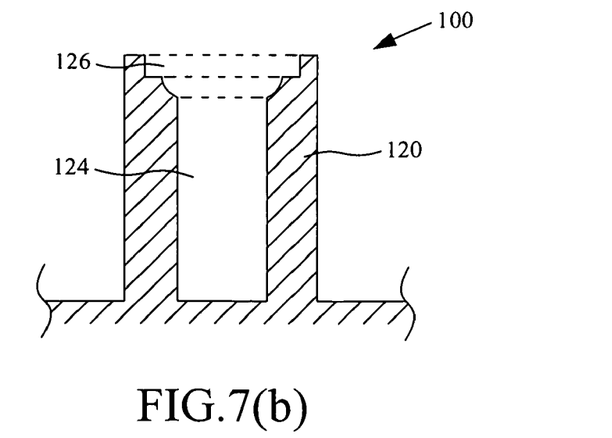

Please refer to FIGS. 7(a) and 7(b) for sectional views of the hot melt structure 100 each having different combinational type of concave portion 126 in the present invention. The longitudinal section of the concave portion 126 described above can be formed by combining at least one rectangular structure, at least one trapezoid structure or at least one structure comprising two opposing curves. As shown in FIG. 7(a), the longitudinal section of the concave portion 126 can be formed by combining a rectangular structure and a trapezoid structure. As shown in FIG. 7(b), the longitudinal section of the concave portion 126 can be formed by combining a rectangular structure and a structure comprising two opposing curves. In this embodiment, the concave portion 126 can be a multilayer structure formed by combining different geometric structures as described above, wherein the arrangement and the number of the geometric structures are not limited in the present invention and can be varied to meet practical design requirements. Therefore the hot melt element 120 tends to flow toward the concave portion 126 when heated so as to cover and fix the fixing element.

Figure 8:
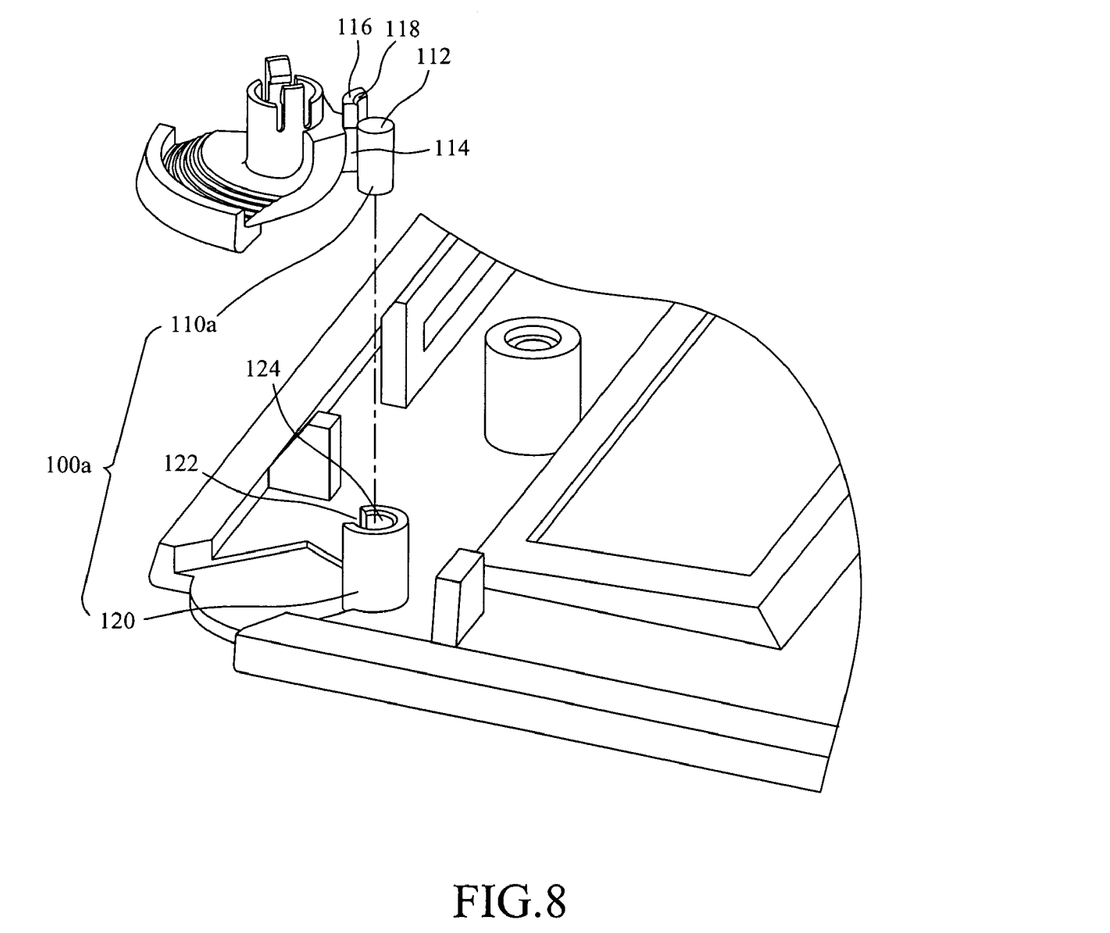
FIG. 8 illustrates an explosive structure view of a hot melt structure in a second embodiment of the present invention.

Please refer to FIG. 8 for an explosive structure view of a hot melt structure 100a in a second embodiment of the present invention. The second embodiment is a variation of the first embodiment, as shown in FIG. 8, the fixing element 110a of the hot melt structure 100a further comprises a corresponding hot melt element 116 disposed on the connecting portion 114, the shape and the position of the corresponding hot melt element 116 correspond to those of the gap portion 122 of the hot melt element 120. The corresponding hot melt element 116 is made of the same hot melt material as the hot melt element 120 and will deform when heated with a certain temperature. Therefore, when the hot melt jig heats the hot melt element 120, the corresponding hot melt element 116 will be heated as well to combine with the hot melt element 120 to fill the gap portion 122 of the hot melt element 120, so the heated hot melt material will not flow to the gap portion 122 and will be more evenly distributed.

Furthermore, the corresponding hot melt element 116 comprises a corresponding concave portion 118, the structure of the corresponding concave portion 118 corresponds to that of the concave portion 126 of the hot melt element 120 to enhance the flow of the heated corresponding hot melt element 116 towards the hollow portion 124 to facilitate the fixing effect.

Figure 9:
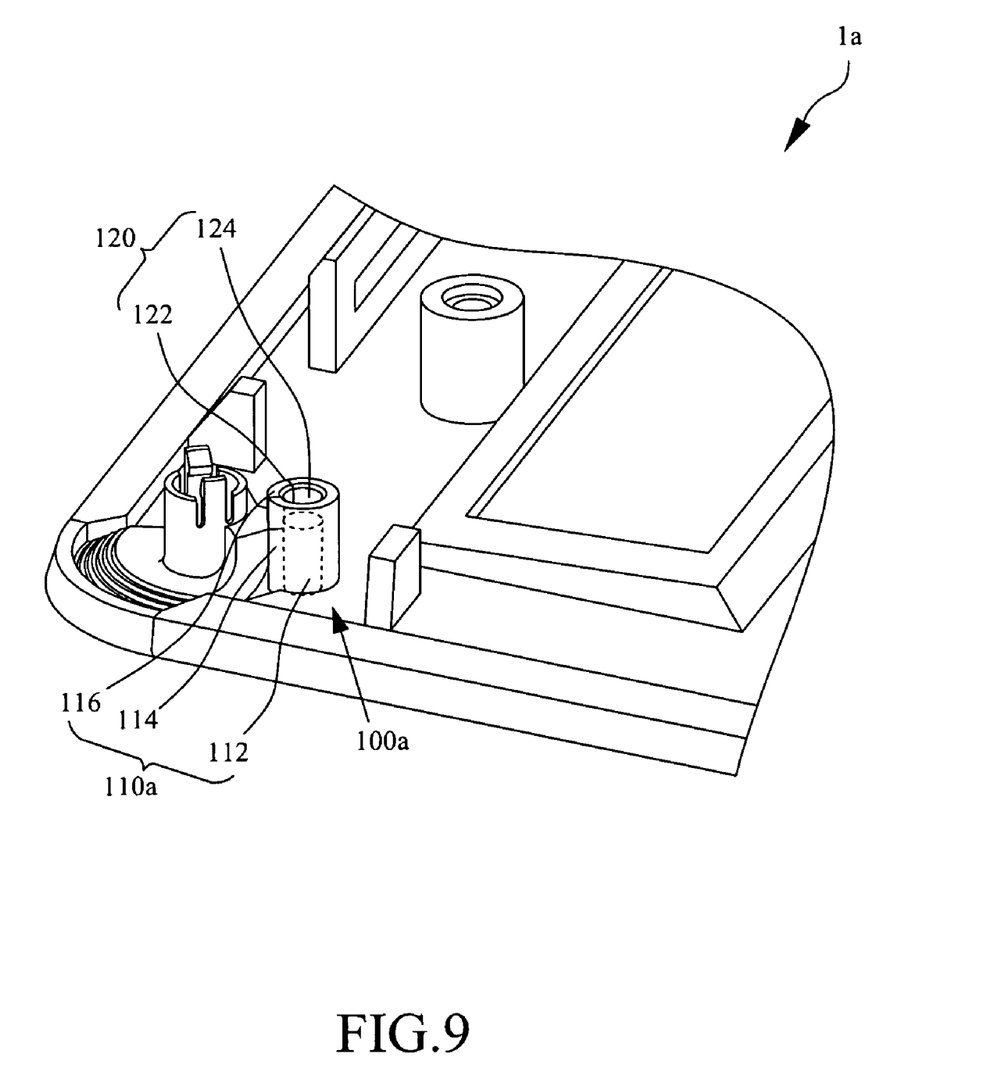
FIG. 9 illustrates a combinational view of the hot melt structure in the second embodiment of the present invention.

Please refer to FIG. 9 for a combinational view of the hot melt structure in the second embodiment of the present invention. Also refer to FIG. 6, the connecting portion 114 of the fixing element 110a correspondingly goes through the gap portion 122 of the hot melt element 120, and the column portion 112 is correspondingly inserted into the hollow portion 124 for combining the fixing element 110a and the hot melt element 120, at this time the corresponding hot melt element 116 is correspondingly disposed at the gap portion 122 to let the hot melt element 120 of the hot melt structure 100a form a nearly cylindrical hollow column with the corresponding hot melt element 116. The height of the corresponding hot melt element 116 combining with the connecting portion 114 is not smaller than the height of the hot melt element 120. In this embodiment, the height of the corresponding hot melt element 116 combining with the connecting portion 114 is substantially equal to the height of the hot melt element 120 to enhance uniformity and more evenly distributed hot melt material. However, the height or the thickness of the corresponding hot melt element 116 can be varied according to design requirements and is not limited by the present embodiment.

Figure 10:
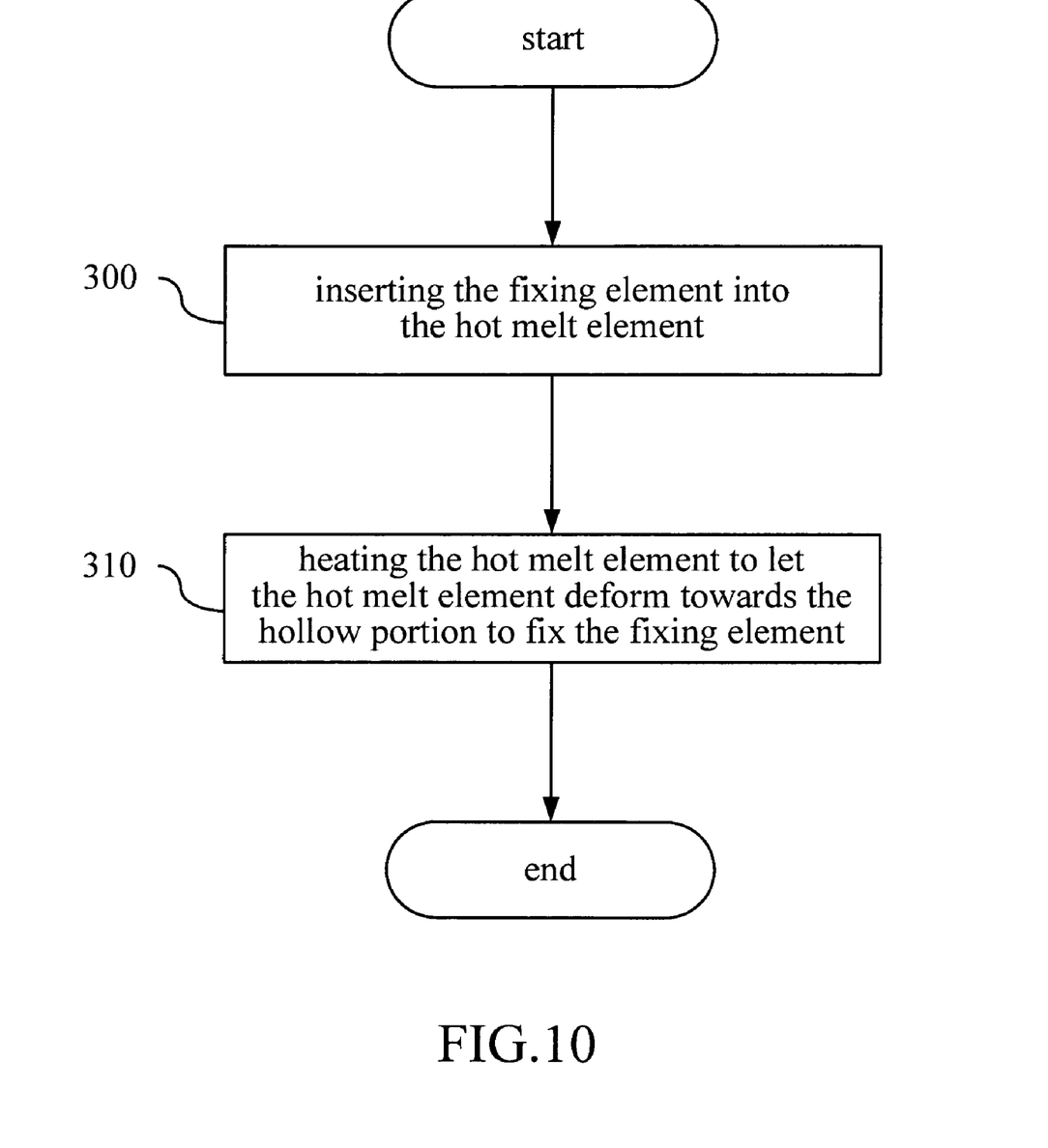
FIG. 10 illustrates a flowchart of a method for combining the hot melt structure in the present invention.

Please refer to FIG. 10 for a flowchart of a method for combining the hot melt structure in the present invention. It is noted that the method is applicable in combining the hot melt structure 100 or the hot melt structure 100a, and any other hot melt structure. The method comprises step 300 to step 310, which is described below:

Step 300: inserting the fixing element 110 into the hot melt element 120. As shown in FIG. 3, insert the fixing element 110 of the first component 10 into the hot melt element 120 of the second component 20, wherein the connecting portion 114 of the fixing element 110 correspondingly goes through the gap portion 122 of the hot melt element 120, and the column portion 112 can be correspondingly disposed in the hollow portion 124; therefore the first component 10 combines with the second component 20 by inserting the fixing element 110 into the hot melt element 120.

Step 310: heating the hot melt element 120 to let the hot melt element 120 deform towards the hollow portion 124 to fix the fixing element 110. As shown in FIG. 4(a) and FIG. 4(b), when the fixing element 110 has been inserted into the hot melt element 120, a hot melt jig can be used for heating the hot melt element 120 to let it deform. The hot melt jig can be a welding torch, and the cross-sectional diameter of the hot melt jig is not smaller than that of the hot melt element 120 so as to totally cover the hot melt element 120 to heat and to melt a portion of the hot melt element 120. The heated hot melt material will flow towards the hollow portion 124 and then reshape, thereby covering the fixing element 110 to fix and position the fixing element 110. Furthermore, the design of the concave portion 126 of the hot melt element 120 and the size of the cross-sectional diameter of the hot melt jig can help the hot melt material flow towards the hollow portion 124 more easily.

Furthermore, as to the second embodiment of the hot melt structure 100a, the heating process in step 310 also heats the corresponding hot melt element 116 on the fixing element 110, since the corresponding hot melt element 116 is also made of hot melt material, so the corresponding hot melt element 116 also flows to the hollow portion 124 when heated, the heated hot melt element 120 and the corresponding hot melt element 116 will integrate as a whole to better fix the fixing element 120.

Please refer to FIG. 2 again, the electronic device 1 comprises the first component 10, the second component 20 and the hot melt structure 100 as described in FIG. 1, the second component 20 correspondingly combines with the first component 10, the fixing element 110 of the hot melt structure 100 is disposed on the first component 10, and the hot melt element 120 of the hot melt structure 100 is disposed on the second component 20. The first component 10 and the second component 20 is to be combined with each other by inserting the fixing element 110 into the hot melt element 120, and by heating the hot melt element 120 to fix the fixing element 110. The electronic device 1 can also replace the hot melt structure 100 with the hot melt structure 100a as described in FIG. 2 to achieve the same effect. The electronic device 1 can be a notebook PC, mobile phone or personal digital assistant (PDA), or other electronic device which comprises different components to be combined; therefore the present invention is not limited to the above described embodiments.

It is noted that the above-mentioned embodiments are only for illustration, it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A hot melt structure for an electronic device, the electronic device comprising a first component and a second component, the hot melt structure comprising:
   a fixing element disposed on the first component; and
   a hot melt element disposed on the second component, the hot melt element comprising a gap portion and a hollow portion through which the fixing element combining with the hot melt element, wherein a height of the hot melt element is larger than that of the fixing element;
   wherein the hot melt element is heated to deform towards the hollow portion to fix the fixing element.

2. The hot melt structure as claimed in claim 1, wherein the fixing element comprises a column portion and a connecting portion, the column portion connects with the connecting portion, the column portion is correspondingly inserted to the hollow portion, and the connecting portion correspondingly goes through the gap portion.

3. The hot melt structure as claimed in claim 1, wherein a cross-sectional diameter of the column portion is larger than a minimum width of the gap portion.

4. The hot melt structure as claimed in claim 1, wherein the hot melt element further comprises a concave portion, a transverse cross sectional diameter of the concave portion is not smaller than that of the hollow portion.

5. The hot melt structure as claimed in claim 4, wherein the transverse cross sectional diameter of the concave portion changes accordingly with a longitudinal depth of the concave portion.

6. The hot melt structure as claimed in claim 4, wherein a longitudinal section of the concave portion forms at least one rectangular structure, at least one trapezoid structure or at least one structure having two opposing curves.

7. The hot melt structure as claimed in claim 1, wherein the fixing element further comprises a corresponding hot melt element disposed on the connecting portion, a shape and a position of the corresponding hot melt element corresponding to those of the gap portion.

8. The hot melt structure as claimed in claim 7, wherein a height of the corresponding hot melt element combining with the connecting portion is not smaller than that of the hot melt element.

9. The hot melt structure as claimed in claim 7, wherein the corresponding hot melt element comprises a corresponding concave portion, a structure of the corresponding concave portion corresponds to that of the concave portion.

10. A method for combining the hot melt structure as claimed in claim 1, comprising the following steps:
    inserting the fixing element into the hot melt element; and
    heating the hot melt element to let the hot melt element deform towards the hollow portion to fix the fixing element.

11. The method as claimed in claim 10, wherein the step of heating the hot melt element further comprising heating the corresponding hot melt element to let the corresponding hot melt element deform towards the hollow portion to fix the fixing element.

12. An electronic device comprising:
a first component;
a second component correspondingly combining with the first component; and
a hot melt structure comprising:
a fixing element disposed on the first component; and
a hot melt element disposed on the second component, the hot melt element comprising a gap portion and a hollow portion through which the fixing element combining with the hot melt element, wherein a height of the hot melt element is larger than that of the fixing element;
wherein the hot melt element is heated to deform towards the hollow portion to fix the fixing element so as to let the first component combine with the second component.

13. The electronic device as claimed in claim 12, wherein the fixing element comprises a column portion and a connecting portion, the column portion connects with the connecting portion, the column portion is correspondingly inserted to the hollow portion, and the connecting portion correspondingly goes through the gap portion.

14. The electronic device as claimed in claim 12, wherein a cross-sectional diameter of the column portion is larger than a minimum width of the gap portion.

15. The electronic device as claimed in claim 12, wherein the hot melt element further comprises a concave portion, a transverse cross sectional diameter of the concave portion is not smaller than that of the hollow portion.

16. The electronic device as claimed in claim 15, wherein the transverse cross sectional diameter of the concave portion changes accordingly with a longitudinal depth of the concave portion.

17. The electronic device as claimed in claim 15, wherein a longitudinal section of the concave portion forms at least one rectangular structure, at least one trapezoid structure or at least one structure having two opposing curves.

18. The electronic device as claimed in claim 15, wherein the fixing element further comprises a corresponding hot melt element disposed on the connecting portion, a shape and a position of the corresponding hot melt element corresponding to those of the gap portion.

19. The electronic device as claimed in claim 18, wherein a height of the corresponding hot melt element combining with the connecting portion is not smaller than that of the hot melt element.

20. The electronic device as claimed in claim 18, wherein the corresponding hot melt element comprises a corresponding concave portion, a structure of the corresponding concave portion corresponds to that of the concave portion.

* * * * *